United States Patent
Bragstad et al.

(10) Patent No.: US 10,042,663 B2
(45) Date of Patent: *Aug. 7, 2018

(54) MAINTAINING VIRTUAL MACHINES FOR CLOUD-BASED OPERATORS IN A STREAMING APPLICATION IN A READY STATE

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/994,774

(22) Filed: Jan. 13, 2016

(65) Prior Publication Data

US 2016/0124769 A1 May 5, 2016

Related U.S. Application Data

(63) Continuation of application No. 14/084,188, filed on Nov. 19, 2013, now Pat. No. 9,298,485.

(51) Int. Cl.
*G06F 9/50* (2006.01)
*G06F 9/48* (2006.01)
(Continued)

(52) U.S. Cl.
CPC ........ *G06F 9/45558* (2013.01); *G06F 9/5083* (2013.01); *G06F 9/5088* (2013.01); *H04L 41/5019* (2013.01); *H04L 43/0817* (2013.01); *H04L 43/0876* (2013.01); *H04L 43/16* (2013.01); *H04L 65/4069* (2013.01); *H04L 65/60* (2013.01); *H04L 65/602* (2013.01);
(Continued)

(58) Field of Classification Search
CPC ..... G06F 9/5083; G06F 9/5088; G06F 9/4856
See application file for complete search history.

(56) References Cited

U.S. PATENT DOCUMENTS

7,272,820 B2 9/2007 Klianev
7,415,704 B2 8/2008 Schmidt et al.
(Continued)

*Primary Examiner* — Shirley Zhang
(74) *Attorney, Agent, or Firm* — Martin & Associates, LLC; Derek P. Martin (57) ABSTRACT

A streams manager monitors performance of a streaming application, and when the performance needs to be improved, the streams manager automatically requests virtual machines from a cloud manager. The cloud manager provisions one or more virtual machines in a cloud with the specified streams infrastructure and streams application components. The streams manager then modifies the flow graph so one or more portions of the streaming application are hosted by the virtual machines in the cloud. When performance of the streaming application indicates a virtual machine is no longer needed, the virtual machine is maintained and placed in a ready state so it can be quickly used as needed in the future without the overhead of deploying a new virtual machine.

15 Claims, 9 Drawing Sheets

(51) Int. Cl.
  *G06F 9/455* (2018.01)
  *H04L 12/26* (2006.01)
  *H04L 29/06* (2006.01)
  *H04L 12/24* (2006.01)
(52) U.S. Cl.
  CPC ............ *H04L 65/80* (2013.01); *G06F 9/4856* (2013.01); *G06F 2009/4557* (2013.01); *G06F 2009/45591* (2013.01); *G06F 2009/45595* (2013.01)

(56) References Cited

U.S. PATENT DOCUMENTS

| | | | |
|---|---|---|---|
| 7,834,875 B2 | 11/2010 | Liu et al. | |
| 8,166,465 B2 | 4/2012 | Feblowitz et al. | |
| 8,359,594 B1 | 1/2013 | Davidson et al. | |
| 8,694,994 B1 | 4/2014 | Vincent et al. | |
| 8,711,148 B2 | 4/2014 | Breeds et al. | |
| 9,015,708 B2 | 4/2015 | Choudhury et al. | |
| 9,021,477 B2 | 4/2015 | Choudhury et al. | |
| 9,027,024 B2 | 5/2015 | Mick et al. | |
| 9,075,662 B2 | 7/2015 | Gedik et al. | |
| 9,081,870 B2 * | 7/2015 | Sax ................ | G06F 17/30958 |
| 9,143,926 B2 | 9/2015 | Egner et al. | |
| 9,146,775 B2 | 9/2015 | Branson et al. | |
| 9,195,559 B2 | 11/2015 | Branson et al. | |
| 9,298,788 B1 * | 3/2016 | Kekre ............. | G06F 17/30569 |
| 9,338,061 B2 * | 5/2016 | Chen .............. | H04L 41/14 |
| 2003/0200295 A1 | 10/2003 | Roberts et al. | |
| 2005/0096872 A1 | 5/2005 | Blevins et al. | |
| 2006/0200251 A1 * | 9/2006 | Gu .................. | H04L 12/4641 700/1 |
| 2007/0261041 A1 | 11/2007 | Amini et al. | |
| 2009/0276771 A1 * | 11/2009 | Nickolov ......... | G06F 9/4856 717/177 |
| 2009/0319687 A1 * | 12/2009 | Goldstein ......... | G06F 9/5083 709/241 |
| 2010/0058342 A1 | 3/2010 | Machida | |
| 2010/0293301 A1 * | 11/2010 | Amini .............. | G06F 9/544 710/12 |
| 2011/0314019 A1 * | 12/2011 | Jimenez Peris .. | G06F 9/5066 707/737 |
| 2012/0137018 A1 * | 5/2012 | Uhlig .............. | G06F 11/004 709/231 |
| 2012/0179809 A1 | 7/2012 | Barsness et al. | |
| 2012/0304192 A1 | 11/2012 | Grove et al. | |
| 2013/0007744 A1 | 1/2013 | Arasaratnam | |
| 2013/0117359 A1 | 5/2013 | Husain et al. | |
| 2013/0173587 A1 | 7/2013 | Imaki et al. | |
| 2013/0179574 A1 | 7/2013 | Calder et al. | |
| 2013/0297802 A1 | 11/2013 | Laribi et al. | |
| 2013/0343380 A1 * | 12/2013 | Canion ............ | H04L 43/50 370/389 |
| 2013/0343388 A1 * | 12/2013 | Stroud ............. | H04L 47/00 370/392 |
| 2014/0068577 A1 | 3/2014 | Gedik et al. | |
| 2014/0068578 A1 | 3/2014 | Gedik et al. | |
| 2014/0196017 A1 | 7/2014 | Halim et al. | |
| 2014/0201642 A1 | 7/2014 | Vicat-Blanc | |
| 2014/0215077 A1 | 7/2014 | Soudan et al. | |
| 2014/0280595 A1 | 9/2014 | Mani et al. | |
| 2015/0026359 A1 | 1/2015 | Uhlig et al. | |
| 2015/0103837 A1 * | 4/2015 | Dutta .............. | H04L 47/125 370/401 |
| 2015/0127807 A1 | 5/2015 | Billore et al. | |
| 2015/0127815 A1 | 5/2015 | Billore et al. | |
| 2015/0128131 A1 | 5/2015 | Cao et al. | |
| 2015/0142951 A1 | 5/2015 | Bragstad et al. | |
| 2015/0143365 A1 | 5/2015 | Bragstad et al. | |
| 2015/0205627 A1 | 7/2015 | Cao et al. | |
| 2015/0207749 A1 | 7/2015 | Cao et al. | |

* cited by examiner

MAINTAINING VIRTUAL MACHINES FOR CLOUD-BASED OPERATORS IN A STREAMING APPLICATION IN A READY STATE

BACKGROUND

1. Technical Field

This disclosure generally relates to streaming applications, and more specifically relates to enhancing performance of a streaming application using cloud resources.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager monitors performance of a streaming application, and when the performance needs to be improved, the streams manager automatically requests virtual machines from a cloud manager. The cloud manager provisions one or more virtual machines in a cloud with the specified streams infrastructure and streams application components. The streams manager then modifies the flow graph so one or more portions of the streaming application are hosted by the virtual machines in the cloud. When performance of the streaming application indicates a virtual machine is no longer needed, the virtual machine is maintained and placed in a ready state so it can be quickly used as needed in the future without the overhead of deploying a new virtual machine.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a streams manager that monitors performance of a streaming application, and when the performance needs to be improved, the streams manager automatically requests virtual machines from a cloud manager. The cloud manager provisions one or more virtual machines in a cloud with the specified streams infrastructure and streams application components. The streams manager then modifies the flow graph so one or more portions of the streaming application are hosted by the virtual machines in the cloud. When performance of the streaming application indicates a virtual machine is no longer needed, the virtual machine is maintained and placed in a ready state so it can be quickly used as needed in the future without the overhead of deploying a new virtual machine.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
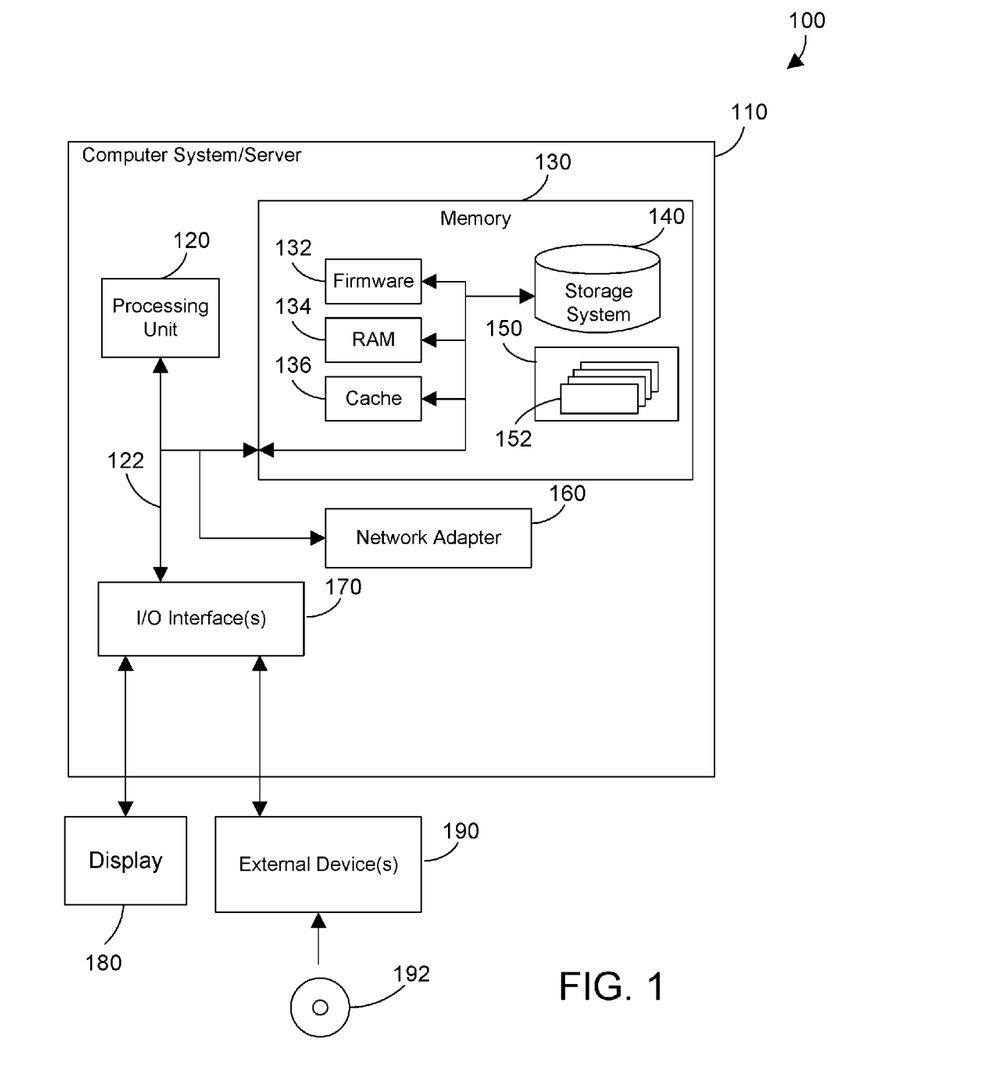
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
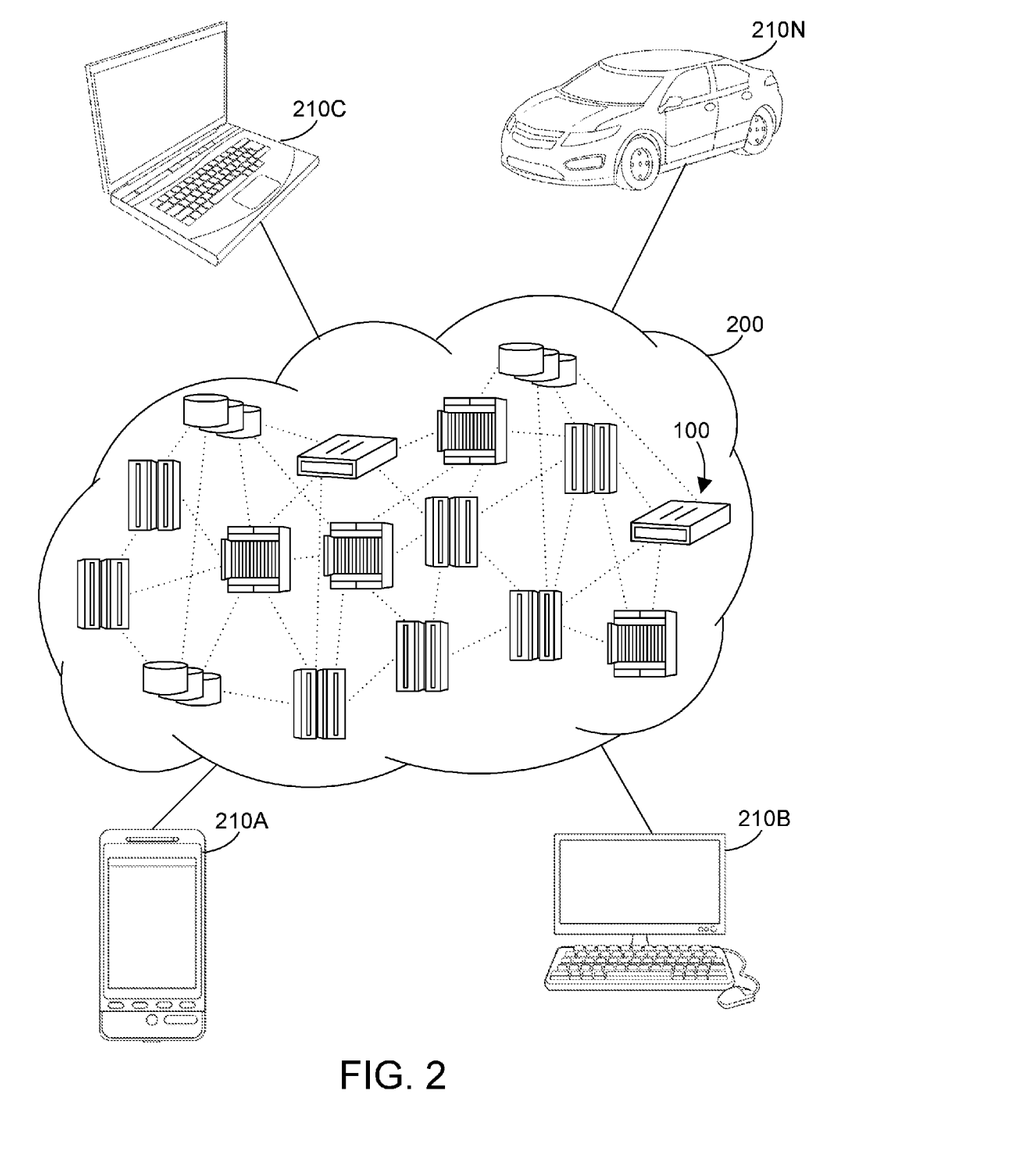
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
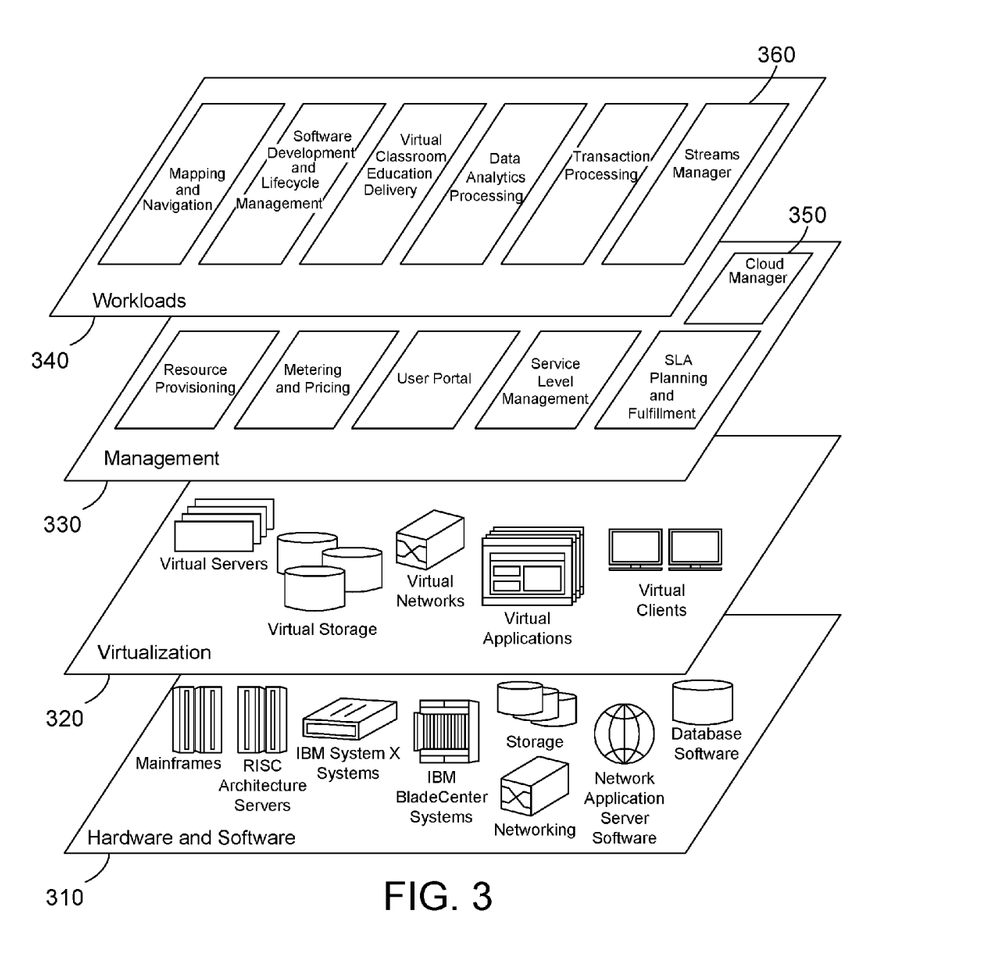
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, Web Sphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
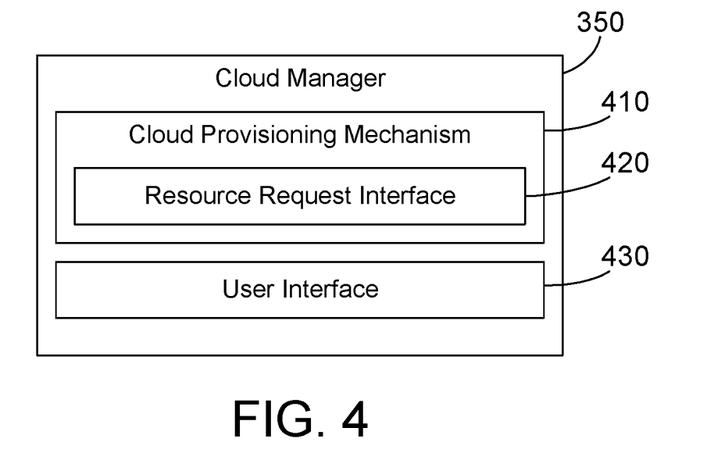
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. Of course, cloud manager 350 could include many other features and functions known in the art that are not shown in FIG. 4.

Figure 5:
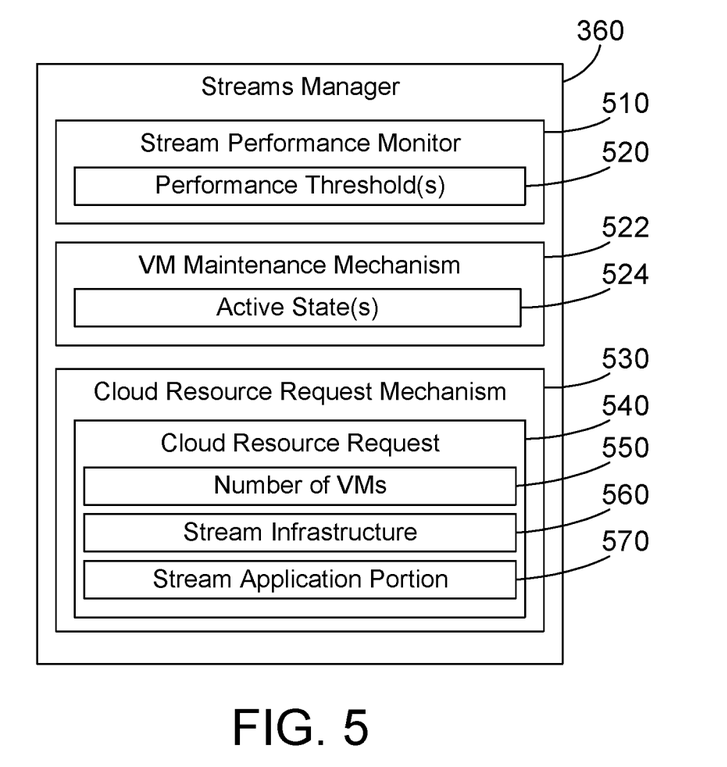
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a streams performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. The stream performance monitor 510 monitors performance of a streaming application, and when current performance compared to the one or more performance thresholds 520 indicates current performance needs to be improved, the stream performance monitor 510 communicates the need for resources to the cloud resource request mechanism 530. The cloud resource request mechanism 530, in response to the communication from the stream performance monitor, assembles a cloud resource request 540, which can include information such as a number of VMs to provision 550, stream infrastructure needed in each VM 560, and a stream application portion 570 for each VM. Once the cloud resource request 540 is formulated, the streams manager 360 submits the cloud resource request 540 to a cloud manager, such as cloud manager 350 shown in FIGS. 3 and 4.

The streams manager 360 also includes a VM maintenance mechanism 522 that can maintain one or more VMs used to implement one or more operators in a flow graph in one or more active states 524 instead of destroying a VM when its operator is no longer needed. By maintaining a VM in an active state, the VM is available for deployment later implementing the same operator at the same location in the flow graph with very little work, or the VM can be deployed to a different part of the flow graph implementing a different operator with a little more work, but still significantly less work than provisioning and deploying a new VM. With VMs available and maintained in a ready state, the streams manager 360 can respond much more quickly to changing conditions, thereby increasing the performance of the streaming application managed by the streams manager 360.

As stated above, when the stream performance monitor 510 determines current performance needs to be improved, the stream performance monitor 510 communicates the need for resources to the cloud resource request mechanism 530 using a cloud resource request 540. The cloud resource request 540 can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

Figure 6:
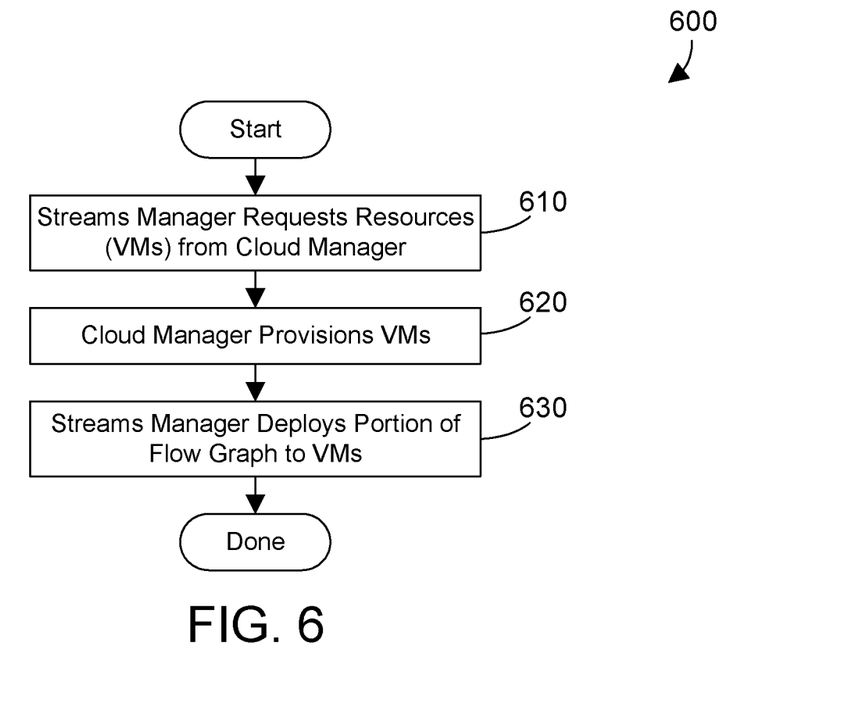
FIG. 6 is a flow diagram of a method for a streams manager to request and receive from a cloud manager virtual machines to improve performance of a streaming application.

Referring to FIG. 6, a method 600 shows one suitable example for enhancing performance of a streaming application, and is preferably performed by the streams manager 360 interacting with the cloud manager 350. The streams manager requests resources, such a VMs, from the cloud manager (step 610). The cloud manager provisions the VMs (step 620). The streams manager then deploys a portion of the flow graph to the VMs (step 630). When the streaming application is not initially hosted in the cloud, the result will be a hybrid implementation of the streams application, with some portions hosted on a dedicated computer system and other portions hosted by one or more VMs in the cloud.

Figure 7:
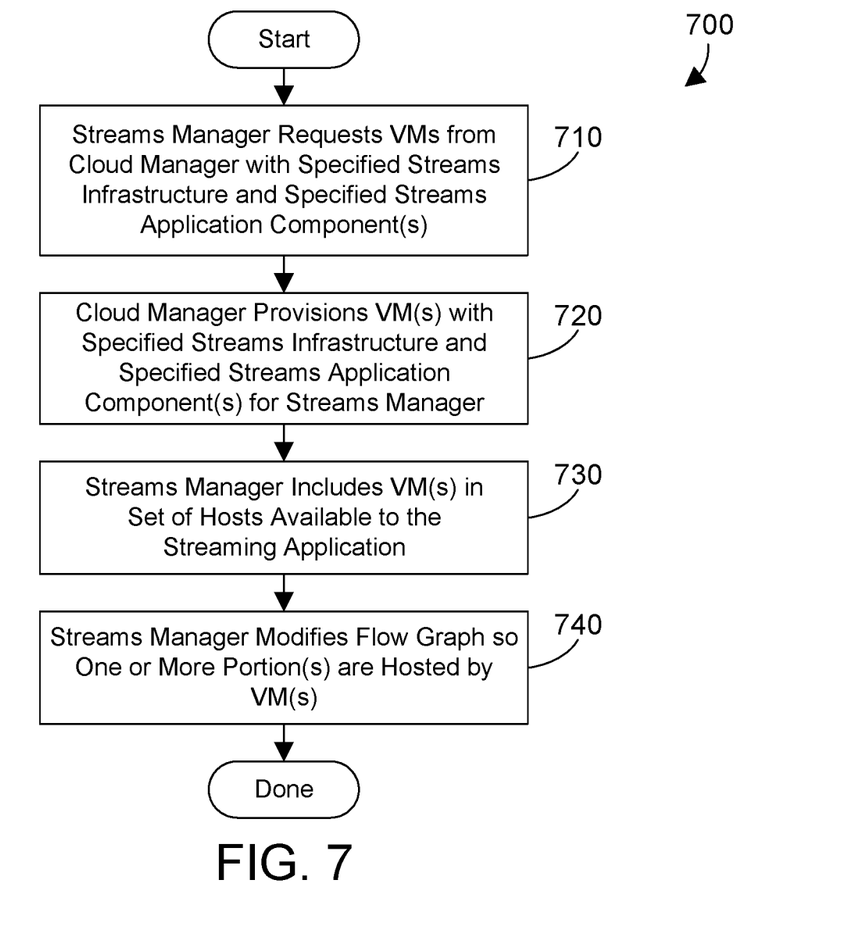
FIG. 7 is a flow diagram of a specific method in accordance with method 600 in FIG. 6 for a streams manager to request and receive from a cloud manager virtual machines to improve performance of a streaming application.

FIG. 7 shows one suitable example of a more specific method 700 for enhancing performance of a streaming application. Note that method 700 could be one specific implementation for method 600 shown in FIG. 6. The streams manager requests a specified number of VMs from the cloud manager with specified streams infrastructure and one or more specified streams application components (step 710). The term "streams infrastructure" as used herein includes any software that is needed to run a component in the streaming application, such as an operating system and middleware that supports executing components in a streaming application. The term "streams application component" can include any component in a streaming application, including operators. The cloud manager provisions the VMs with the specified streams infrastructure and the one or more specified streams application components in response to the request from the streams manager (step 720). The streams manager includes the VMs in the set of hosts available to the streaming application (step 730). The streams manager then modifies the flow graph so one or more portions of the flow graph are hosted by the one or more VMs provisioned by the cloud manager (step 740).

Figure 8:
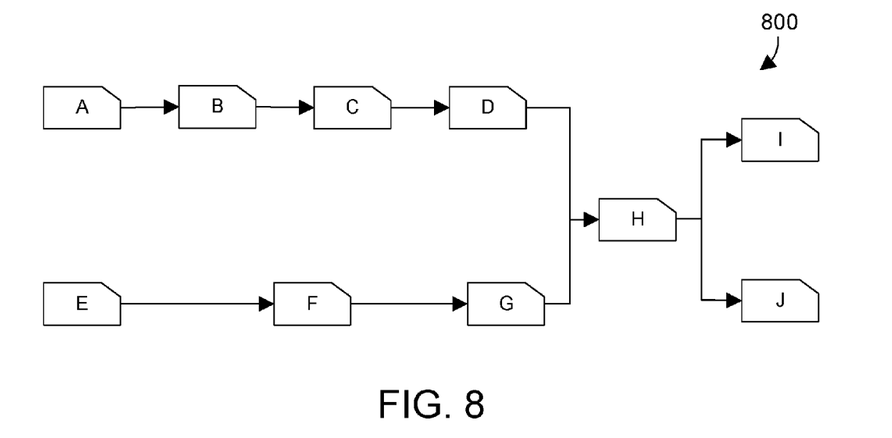
FIG. 8 is a block diagram of one specific example of a streaming application.
Figure 9:
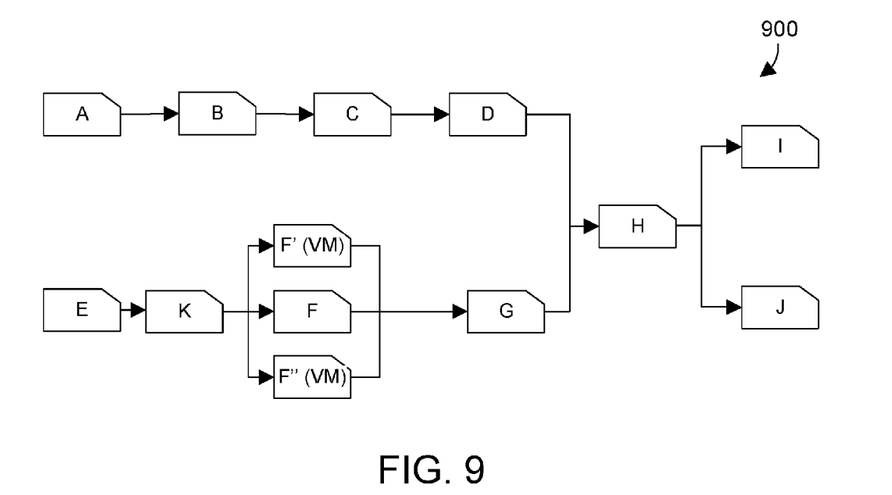
FIG. 9 is a block diagram showing the streaming application in FIG. 8 after the addition of two virtual machines provisioned from a cloud.

A simple example is provided in FIGS. 8 and 9 to illustrate some of the concepts discussed above. Referring to FIG. 8, a streaming application 800 includes operators A, B, C, D, E, F, G, H, I and J as shown. Operator A originates a stream of tuples, which is processed by operator B, which outputs tuples. The tuples from operator B are processed by operator C, which outputs tuples to operator D, which processes the tuples and outputs its tuples to operator H. In similar fashion, operator E originates a stream of tuples, which is processed by operator F, which outputs tuples that are processed by operator G, which outputs tuples to operator H. Note that operator H receives tuples from both operator D and operator G. Operator H processes the tuples it receives from operator D and from operator G, and outputs its tuples to operators I and J. We assume for this example the streaming application 800 runs on a dedicated system, such as a computer system/server 100 shown in FIG. 1.

The stream performance monitor 510 in FIG. 5 monitors performance of the streaming application 800 in FIG. 8 in accordance with one or more defined performance thresholds 520. An example of a suitable performance threshold 520 is percent of capacity used. A performance threshold of say, 80% could be specified for operator F in FIG. 8. Note a performance threshold can apply to a specified operator, to a specified a group of operators, or to all operators in the streaming application. We assume the streaming application 800 runs with operator F operating at less than 80% capacity, but due to increased demand, the performance of operator F grows to exceed 80% capacity. In response to the performance of operator F exceeding the 80% defined performance threshold, the streams manager requests cloud resources to relieve the load on operator F. For example, the streams manager could request the cloud manager provision two VMs with streams infrastructure that supports running components of the streaming application and with the logic for operator F (step 710 in FIG. 7). In response, the cloud manager provisions two VMs with the specified stream infrastructure and with the logic for operator F (step 720). The streams manager includes the two VMs in the set of hosts available to the streaming application (step 730). The streams manager then modifies the flow graph so one or more portions are hosted by the two VMs just provisioned (step 740). The modifications to the flow graph are shown in the streaming application 900 in FIG. 9 to include a new operator K and new operators F' and F" that implement the functions of operator F in two different virtual machines and that work in parallel with operator F. Note the new operator K is needed to split the tuples coming from operator E into three sets that are distributed to operators F, F' and F". Note that operators F' and F" are hosted on the virtual machines in the cloud provisioned by the cloud manager, as indicated by the VM in these operators, while operator F is hosted by a dedicated computer system that runs the rest of the streaming application 900 shown in FIG. 9. The result is a hybrid system, with some operators in the streaming application 900 hosted on the dedicated computer system, with other operators, such as operators F' and F", hosted in the cloud.

While the simple example in FIGS. 8 and 9 shows two new operators F' and F" that implement the function of operator F, this is not to be construed as limiting of the concepts herein. Any suitable number of operators could be deployed in a single VM. For example, if performance of operators B, C and D all exceed one or more of the defined performance thresholds, a single VM could be provisioned with the logic for all of operators B, C and D. In addition, a VM could be provisioned to implement two different unrelated operators. For example, if operators C and F both exceed one or more of the defined performance thresholds, a single VM could be provisioned that implements both operator C and operator F. The disclosure and claims herein expressly extend to any number of virtual machines that implement any suitable number of operators.

Figure 10:
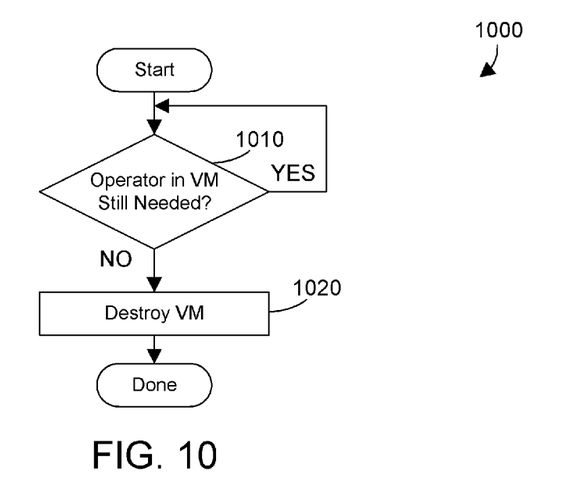
FIG. 10 is a flow diagram of a method for destroying a virtual machine that implements an operator in a flow graph when the operator is no longer needed.

Referring to FIG. 10, a method 1000 is preferably performed by the streams manager 360. When an operator in a VM is still needed (step 1010=YES), method 1000 loops back and continues until the operator in the VM is no longer needed (step 1010=NO). At this point the VM is destroyed (step 1020), and method 1000 is done. In typical cloud environments, when a virtual machine is no longer needed, it is destroyed. This can be done in different ways. For example, a virtual machine could be destroyed, or could simply be marked for destruction, with a cloud maintenance mechanism actually performing the destruction during routine processing at a later time.

Figure 11:
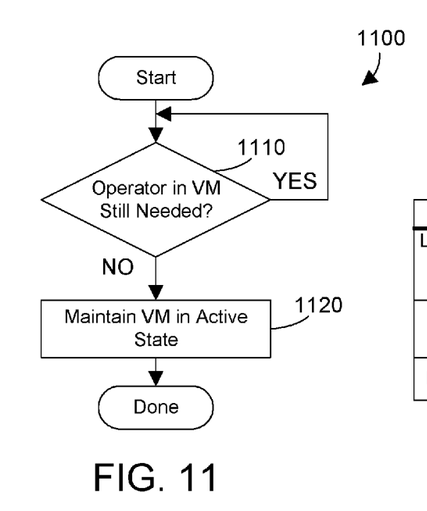
FIG. 11 is a flow diagram of a method for maintaining a virtual machine in an active state when the operator in the virtual machine is no longer needed.

Destroying a VM as shown in FIG. 10 may not provide the best course of action. Referring to FIG. 11, a method 1100 is preferably performed by the streams manager 360. When an operator in a VM is still needed (step 1110=YES), method 1100 loops back and continues until the operator in the VM is no longer needed (step 1110=NO). The VM is then maintained in an active state (step 1120). By maintaining the VM in an active state, the VM can be quick redeployed to implement the same operator, or to deploy a different operator, much more quickly than the time needed to provision and deploy a new VM.

Figure 12:
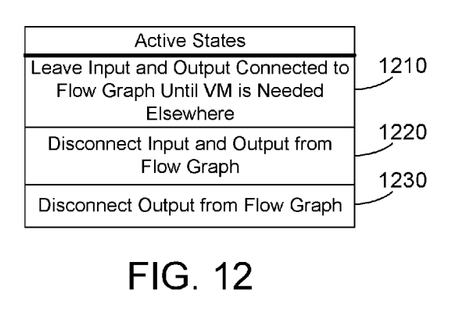
FIG. 12 is a table that lists examples of active states for a virtual machine.

Some suitable examples of active states are shown in the table in FIG. 12. A first active state is to leave the input and output connected to the flow graph until the VM is needed elsewhere, as shown at 1210. A second active state is to disconnect the input and output from the flow graph, as shown at 1220. A third active state is to leave the input connected to the flow graph, but disconnect the output from the flow graph, as shown at 1230. Note that in each of these active states, the VM is still running. Each of these active states in FIG. 12 are discussed in more detail below.

The first active state 1210 in FIG. 12 leaves the VM running and leaves the input and output connected to the flow graph until the VM is needed elsewhere. Thus, for the flow graph in FIG. 9, we assume the streams manager determines the VMs implementing operators F' and F" are no longer needed. While not needed for performance reasons, they are left in the flow graph as shown in FIG. 9 with their inputs and outputs connected, and processing tuples until the streams manager determines the VMs that implement operators F' and F" are needed elsewhere. At this point the VMs will be deployed to a different part of the flow graph to address other performance issues.

Figure 13:
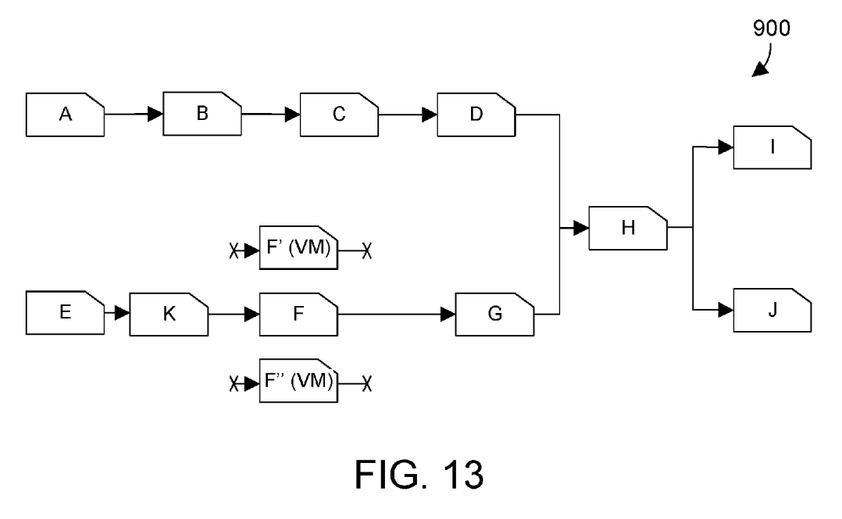
FIG. 13 is a block diagram of one specific example of the streaming application in FIG. 9 after the inputs and outputs of the two virtual machines that implement operators F' and F" have been disconnected from the flow graph, keeping the virtual machines for operators F' and F" in a ready state.

The second active state 1220 in FIG. 12 leaves the VM running, but disconnects the input and output of the of the operator from the flow graph. For the flow graph shown in FIG. 9, the second active state is shown graphically in FIG. 13. We assume again the streams manager determines the VMs implementing operators F' and F" are no longer needed. The streams manager disconnects the inputs and outputs of the VMs implementing F' and F" from the flow graph, as shown in FIG. 13, while keeping the VMs running. Should the VMs produce any tuples even though their inputs are disconnected, the tuples are discarded. Because the VMs are running, but are in a disconnected state, they can be easily reconnected to the flow graph as needed. In the alternative, they can be redeployed to a different part of the flow graph by the streams manager without having to request new virtual machines from the cloud manager.

Figure 14:
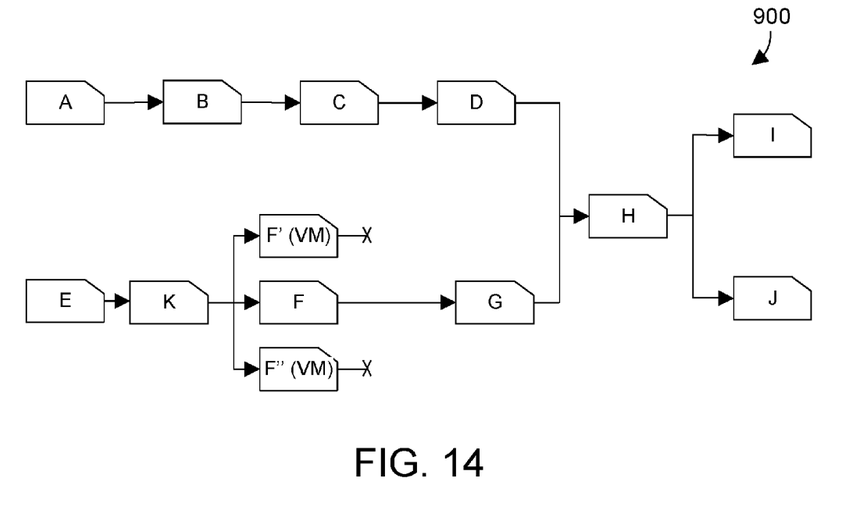
FIG. 14 is a block diagram of one specific example of the streaming application in FIG. 9 after the outputs of the two virtual machines that implement operators F' and F" have been disconnected from the flow graph, keeping the virtual machines for operators F' and F" in a ready state.

The third active state 1230 in FIG. 13 leaves the VMs running, but disconnects the output of the operator from the flow graph. For the flow graph shown in FIG. 9, the third active state is shown graphically in FIG. 14. We assume again the streams manager determines the VMs implementing operators F' and F" are no longer needed. The streams manager disconnects the outputs of the VMs implementing F' and F" from the flow graph while keeping the inputs connected and the VMs running, as shown in FIG. 14. Note the streams manager will change the logic of operator K when the VMs for F' and F" have their outputs disconnected. Instead of splitting the tuples between F, F' and F" so these three process different tuples in parallel, operator K will route all of the tuples to each of F, F' and F". The tuples produced by the VMs that implement F' and F" are discarded. Because the VMs are running, but are in a disconnected state, they can be easily reconnected to the flow graph as needed. In the alternative, they can be redeployed to a different part of the flow graph by the streams manager without having to request new virtual machines from the cloud manager. Note that redeploying may require waiting until all tuples in-flight have finished processing. In addition, the third active state 1230 has the added advantage of actively processing tuples in parallel with the original operator F. This allows the VMs that implement F' and F" to be quickly reconnected into the flow graph with very little lag because they are already actively processing tuples. In addition, should operator F have a problem or go down altogether, the tuples operator F was processing are also being processed in parallel by F' and F", so the streams manager may be able to recover from operator F crashing without missing any data by using the data that was being processed in parallel by F' and F".

Note the active states shown in FIG. 12 are shown by way of example. Other active states could also be used. The active states are not mutually exclusive. The streams manager can use any active state or any suitable combination of active states for different flow graphs or for different operators in the same flow graph. For example, the streams manager could maintain a first virtual machine in a flow graph in the first active state 1210, could maintain a second virtual machine in the same flow graph in the second active state 1220, and could maintain a third virtual machine in the same flow graph in the third active state 1230. The disclosure and claims herein expressly extends to using any suitable active state or combination of active states for virtual machines that implement streaming operators in a flow graph.

The disadvantage of keeping virtual machines in an active state is the use of virtual machine resources even though their use from a performance standpoint is not currently needed. The advantage of keeping the virtual machines in an active state is these VMs can be easily and readily redeployed to a different part of the flow graph by the streams manager without having to request new virtual machines from the cloud manager. Because streaming applications process data in near real-time, the advantage of keeping virtual machines that implement streaming operators in a ready state so they can be quickly and efficiently redeployed can often outweigh the cost.

The streaming application disclosed and claimed herein provides an incredibly powerful and flexible way to improve the performance of a streaming application. A dedicated computer system can include minimal resources that can run the streaming application at periods of low demand, while allowing the capacity of the streaming application to be automatically expanded using cloud resources as needed. Keeping virtual machines in a ready state allows these virtual machines to be used by the streams manager without the overhead of deploying a new virtual machine. This provides a very powerful and cost-effective solution to running streaming applications.

The disclosure and claims herein relate to a streams manager that monitors performance of a streaming application, and when the performance needs to be improved, the streams manager automatically requests virtual machines from a cloud manager. The cloud manager provisions one or more virtual machines in a cloud with the specified streams infrastructure and streams application components. The streams manager then modifies the flow graph so one or more portions of the streaming application are hosted by the virtual machines in the cloud. When performance of the streaming application indicates a virtual machine is no longer needed, the virtual machine is maintained and placed in a ready state so it can be quickly used as needed in the future without the overhead of deploying a new virtual machine.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    at least one processor;
    a memory coupled to the at least one processor;
    a streaming application residing in the memory and executed by the at least one processor, the streaming application comprising a flow graph that includes a plurality of operators that process a plurality of data tuples; and
    a streams manager residing in the memory and executed by the at least one processor, the streams manager monitoring performance of the streaming application, and when performance of the streaming application needs to be improved, the streams manager requests a cloud manager to provision at least one virtual machine with logic to implement at least one of the plurality of operators, and when the cloud manager provisions the at least one virtual machine, the streams manager modifies the flow graph to include the at least one virtual machine in the flow graph of the streaming application, and when the streams manager determines the at least one virtual machine is no longer needed, the streams manager keeps a first of the at least one virtual machine in a first ready state until the first virtual machine is needed by the streams manager to be deployed to implement at least one of the plurality of operators, wherein the first ready state comprises a first state where the first virtual machine is running with an input and an output of an operator implemented by the virtual machine connected to the flow graph and with the operator processing data tuples received on the input and outputting processed data tuples on the output, wherein the streams manager keeps a second of the at least one virtual machine in a second ready state until the second virtual machine is needed to implement at least one of the plurality of operators, wherein the second ready state comprises a second state where the second virtual machine is running with an input of an operator implemented by the second virtual machine connected to the flow graph and an output of the operator disconnected from the flow graph.

2. The apparatus of claim 1 wherein the streams manager keeps a third of the at least one virtual machine in a third ready state until the third virtual machine is needed to implement at least one of the plurality of operators, wherein the third ready state comprises a third state where the third virtual machine is running with an input and an output of an operator implemented by the third virtual machine disconnected from the flow graph.

3. The apparatus of claim 1 wherein the streams manager reuses the at least one virtual machine in the first ready state by deploying the at least one virtual machine to implement at least one of the plurality of operators.

4. The apparatus of claim 1 wherein the streams manager monitors the performance of the streaming application by comparing current performance of the streaming application to at least one defined performance threshold.

5. The apparatus of claim 4 wherein the streams manager, by comparing the performance of the streaming application to the at least one defined threshold, determines when the performance of the streaming application needs to be improved.

6. The apparatus of claim 1 wherein the at least one virtual machine implements logic for a selected one of the plurality of operators, wherein the at least one virtual machine processes tuples in parallel with the selected one operator in the flow graph after the streams manager modifies the flow graph of the streaming application.

7. The apparatus of claim 6 wherein the streams manager modifies the flow graph to include a new operator that splits tuples from an existing operator to the selected one operator in the flow graph and to the at least one virtual machine that processes the tuples in parallel with the selected one operator in the flow graph.

8. A program product comprising software stored on a non-transitory computer readable storage medium, the software comprising:
 a streams manager that monitors performance of a streaming application comprising a flow graph that includes a plurality of operators that process a plurality of data tuples, and when performance of the streaming application needs to be improved, the streams manager requests a cloud manager to provision at least one virtual machine with logic to implement at least one of the plurality of operators, and when the cloud manager provisions the at least one virtual machine, the streams manager modifies the flow graph to include the at least one virtual machine in the flow graph of the streaming application, and when the streams manager determines the at least one virtual machine is no longer needed, the streams manager keeps a first of the at least one virtual machine in a first ready state until the first virtual machine is needed by the streams manager to be deployed to implement at least one of the plurality of operators, wherein the first ready state comprises a first state where the first virtual machine is running with an input and an output of an operator implemented by the virtual machine connected to the flow graph and with the operator processing data tuples received on the input and outputting processed data tuples on the output, wherein the streams manager keeps a second of the at least one virtual machine in a second ready state until the second virtual machine is needed to implement at least one of the plurality of operators, wherein the second ready state comprises a second state where the second virtual machine is running with an input of an operator implemented by the second virtual machine connected to the flow graph and an output of the operator disconnected from the flow graph.

9. The program product of claim 8 wherein the streams manager keeps a third of the at least one virtual machine in a third ready state until the third virtual machine is needed to implement at least one of the plurality of operators, wherein the third ready state comprises a third state where the third virtual machine is running with an input and an output of an operator implemented by the third virtual machine disconnected from the flow graph.

10. The program product of claim 8 wherein the streams manager reuses the at least one virtual machine in the first ready state by deploying the at least one virtual machine to implement at least one of the plurality of operators.

11. The program product of claim 8 wherein the streams manager monitors the performance of the streaming application by comparing current performance of the streaming application to at least one defined performance threshold.

12. The program product of claim 11 wherein the streams manager, by comparing the performance of the streaming application to the at least one defined threshold, determines when the performance of the streaming application needs to be improved.

13. The program product of claim 8 wherein the at least one virtual machine implements logic for a selected one of the plurality of operators, wherein the at least one virtual machine processes tuples in parallel with the selected one operator in the flow graph after the streams manager modifies the flow graph of the streaming application.

14. The program product of claim 13 wherein the streams manager modifies the flow graph to include a new operator that splits tuples from an existing operator to the selected one operator in the flow graph and to the at least one virtual machine that processes the tuples in parallel with the selected one operator in the flow graph.

15. An apparatus comprising:
 at least one processor;
 a memory coupled to the at least one processor;
 a streaming application residing in the memory and executed by the at least one processor, the streaming application comprising a flow graph that includes a plurality of operators that process a plurality of data tuples; and
 a streams manager residing in the memory and executed by the at least one processor, the streams manager monitoring performance of the streaming application, and when performance of the streaming application needs to be improved, the streams manager requests a cloud manager to provision a plurality of virtual machines that each includes logic to implement at least one of the plurality of operators, and after the cloud manager provisions the plurality of virtual machines, the streams manager modifies the flow graph to include the plurality of virtual machines in the flow graph of the streaming application, and when the streams manager determines the plurality of virtual machines are no longer needed, the streams manager:
  keeps a first of the plurality of virtual machines in a first ready state until the first virtual machine is needed by the streams manager to be deployed to implement at least one of the plurality of operators, wherein the first ready state comprises a first state where the first virtual machine is running with an input and an output of an operator implemented by the virtual machine connected to the flow graph; and
  keeps a second of the plurality of virtual machines in a second ready state until the second virtual machine is needed to implement at least one of the plurality of operators, wherein the second ready state comprises a second state where the second virtual machine is running with an input of an operator implemented by the second virtual machine connected to the flow graph and an output of the operator disconnected from the flow graph.

* * * * *